March 25, 1930. J. J. DALY 1,751,545
METHOD OF MAKING BOX TOES FOR SHOES
Filed July 18, 1928
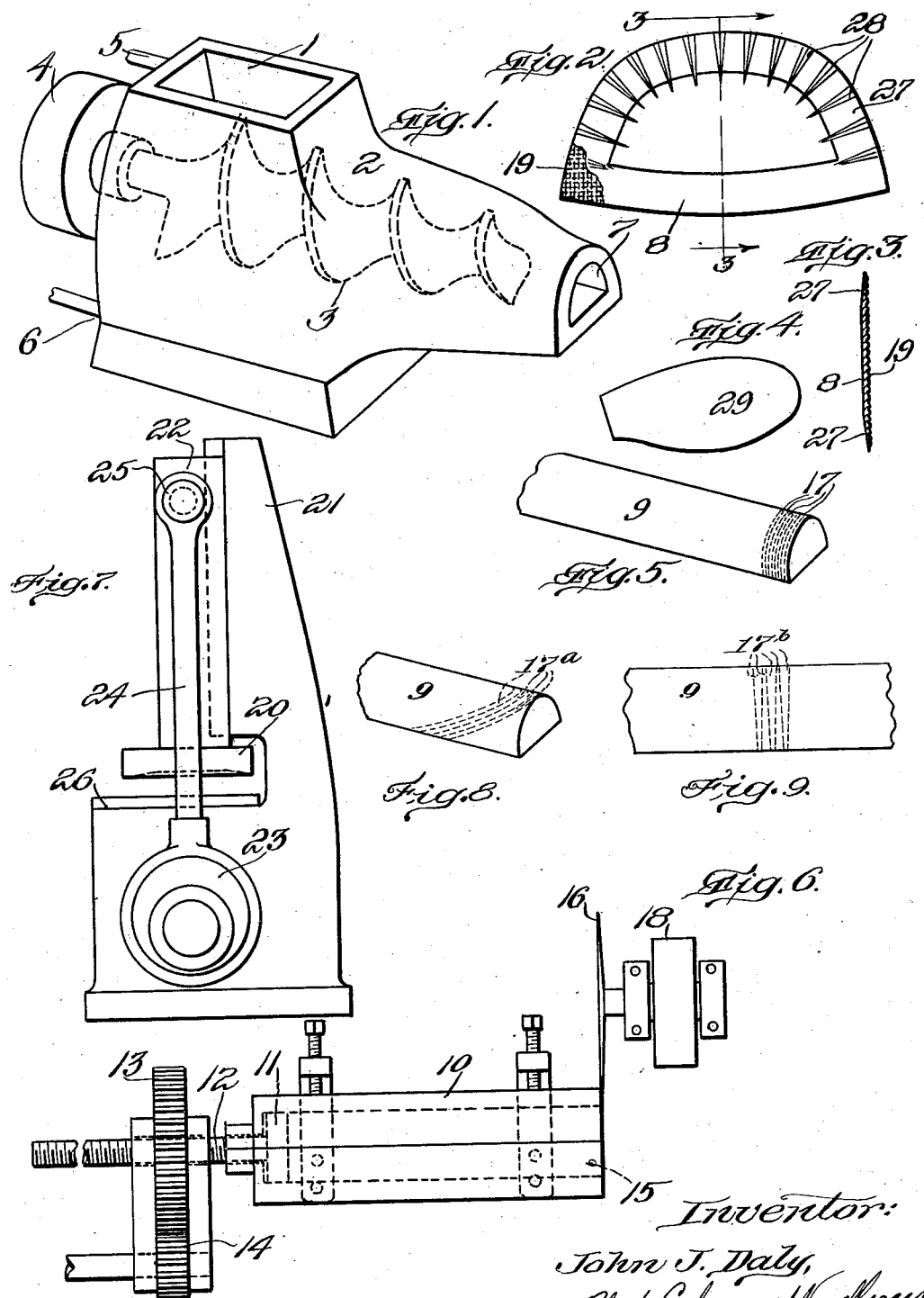
Inventor:
John J. Daly,
by Roberts, Cushman & Woodberry
attys.

Patented Mar. 25, 1930

1,751,545

UNITED STATES PATENT OFFICE

JOHN J. DALY, OF NEWTON, MASSACHUSETTS, ASSIGNOR TO NORTH AMERICAN CHEMICAL COMPANY, OF BOSTON, MASSACHUSETTS, A CORPORATION OF MASSACHUSETTS

METHOD OF MAKING BOX TOES FOR SHOES

Application filed July 18, 1928. Serial No. 293,512.

The object of my present invention is to find a practical means of utilizing the ordinary scrap and skeletons which accumulate in great quantities in connection with the manufacture of the usual box toe blanks. The material which I desire thus to utilize to the profit of the box toe manufacturer as well as the shoe manufacturer, is usually composed of just those high grade and expensive ingredients and materials which are used in the manufacture of the best or most approved box toes, and yet heretofore that have been not only wasted in the factory but entirely lost as no use has heretofore been found for them. Therefore it is unnecessary for me to give any formula, as it will be understood that I am utilizing the scrap of the large variety of standard box toe materials, such as felt impregnated with bituminous and resinous stiffening compounds and various other masticated plastics backed with supporting gauze, canvas, etc., into relatively stiff but yet durable and frequently flexible sheet-like pieces.

Accordingly I place a quantity of such scrap in a heated mixer, masticator or digester, all these terms being current in rubber mills, and convert the scrap into a more or less plastic mass. Having reduced the mass thus in well known manner the same as is common in connection with plastic masses in the rubber mills or manufacture, I then introduce the mass thus softened into a tubing machine having at its outgoing end a die having the same shape as that of the ultimate box toe blank excepting that it is a little smaller. This machine forces out a bar or column having the aforesaid cross section. Preferably then this column is permitted to set as hard as its constituents will permit it to set. Next it is put into a mold having the same cross section shaped as this set or hardened column or bar, said mold having a usual plunger and feeding mechanism at one end and a usual rotary shearing cutter at the other end. This machine is set so as to cut from the bar, blanks of substantially the desired thickness which the box toe blank is to have. Having thus formed the individual blanks they are next fed under a dinker or press for the purpose of securing them to a suitable fabric backing and at the same time forming the thin, feather edge all around the margin of the blank the same as has always heretofore been accomplished by the difficult, expensive and wasteful act of skiving in a more or less delicate skiving machine. The fastening of the required backer onto the moldable blank is accomplished simply by pressure, the machine being so constructed and operated as to feed in a blank of cloth or backer material simultaneously with one of the severed plastic blanks and then the plunger or press squeezes them together in well known manner so that the backer is pressed into the blank mass and the latter is pressed into the backer in an immovable union, and simultaneously the same pressure, together with the shape of the die or forming portion of the press head, spreads and squeezes the blank along its peripheral edge so as to produce the required feather edge, and at the same time extend the blank to its full size as required for the finished box toe blank.

It will be understood that preferably I use well known rubber making or plastic working machines and the same can be more or less automatic according to the output and requirements, or the method can be carried out largely by hand, and also I do not confine my method to the materials mentioned.

In the drawings in which I have conventionally illustrated the method sufficiently to make the same readily understood, Fig. 1 is a perspective view of one kind of well known tube machine;

Figs. 2 and 3 are respectively a top plan view and an edge view of a typical box toe blank;

Fig. 4 is a top plan view of a shoe filler piece, showing how my method is adaptable to such article;

Fig. 5 is a perspective view of the plastic bar or column to be cut;

Fig. 6 is a front elevation of a feeding mold rotary cutter; and

Fig. 7 shows in front elevation the essential portion of a dinker or press; and Figs. 8 and 9 illustrate modifications.

Having reduced the scrap to a digested plastic mass or dough as stated, it is dumped into the hopper 1 of a tube machine 2 and fed slowly forward in well known manner by the screw 3 under power 4, said machine being usually heated as by a steam jacket, the inlet being herein indicated conventionally at 5 and the outlet at 6. The plastic mass, thus thoroughly compacted into a homogeneous mass is forced out of the die opening 7 shaped the same as the ultimate blank 8, Fig. 2, excepting that it is slightly smaller. The result is that the plastic mass slowly extrudes as a bar or column from the die opening 7 with a cross section exactly the same as shown in Fig. 2 excepting that it is slightly smaller. This bar or column is shown at 9 in Fig. 5 and is now preferably cooled, and when it has thoroughly set so that it can be more easily cut without distortion, it is placed in the mold 10 of a cutting machine whose plunger 11 is operated by any suitable step by step feeding mechanism such as a screw 12, gears or pulleys 13, 14 (the rest of the machine not being herein shown as it is a well known type) thereby forcing the bar of set plastic material forward step by step at a regulated speed out of the die opening 15 which corresponds with the die opening 7 of the tube machine in the path of a rotary shearing cutter 16 operated in step with the feeding movement. This is all in well known manner so as to slice successive blanks or slices from the protruding end of the set bar or column as indicated at 17 by dotted lines, Fig. 5. This slicing is conducted cold and it may be in water. I have simply shown conventionally by pulley or gear 18 the driving mechanism of the cutter 16. The operator next takes the cut leaves or blanks 17 which have now been sliced from the bar or column 9 and places them one by one, together with a similarly shaped fabric backer 19, Fig. 2, under the pressure die 20 of a dinking machine or heavy press 21. The pieces of fabric 19 are the same shape as the sliced blank excepting that they are slightly larger in area, having the same size to which the blank is to be spread or pressed by the dinking machine. The dinking machine may be of any of the well known kinds, being herein shown as a vertical press having its die 20 mounted for up and down movement at the lower end of a plunger 22 operated by a powerful eccentric 23, and links 24 from a cross head 25. A piece of fabric 19 and a sliced plastic portion 17 are put in proper position on the usual bed or die plate 26 and then when the die 20 comes down it impregnates them with each other or forces them into permanent union with each other and simultaneously by reason of its slightly slanting periphery squeezes the plastic material down to the shape required for making the feather edge 27 as clearly shown in Figs. 2 and 3.

For facilitating this step of my method, the sliced pieces 17 are preferably in temper, i. e. softened slightly by heat or steam, for this operation. The dinking operation is very rapid, or at least it should be, and although I have mentioned that the operator feeds in the pieces, it will be understood that the feeding in actual practice is automatic as is common in connection with such machines and such multiple manufacture.

Preferably also the die is so shaped as to make a series of radial wedge shaped grooves or impressions 28 therein all around the toe forming edge to facilitate the subsequent crimping and folding and shaping of the ultimate finished box toe blank in the lasting operation. All this shaping or finishing, compacting, and feather edge forming is accomplished by one single hammer-like stroke. This is exceedingly simple, inexpensive, and uniform so far as the labor and manufacturing expense is concerned. As to the finished article it renders the edge strong where it has heretofore been frail and makes it capable of free, careless manipulation if desired without danger of cracking and tearing. And because of the crimping-grooves or depressions 28. it greatly facilitates the ease of shaping and manipulating in lasting the box.

My invention in many of its features is capable of other uses, and to illustrate the same I have shown in Fig. 4 a piece of the plastic material sliced or formed into a shoe filler piece 29. It will be understood that one of my main objects, as first stated, is to find a way of turning into practical use and profit the vast accumulations of scrap of the kind first mentioned, and accordingly I have shown the shoe filler piece 29 as one further outlet for the same, as this same scrap when reduced to the plastic condition and mixed by forcing it through a tube machine or any other kind of pressure molding apparatus, is capable of use as a shoe bottom filler, especially for McKay shoes. Heretofore it has been common to use tar paper and paste board died out to approximate the shape of the shoe bottom cavity. My method makes it no longer necessary to have such hard, parallel-sided pasteboard or the like, but according to my method, the dinking step, if used, would be relied upon to mold the slice to fit the shoe bottom as to depth making the toe end thicker and the ball or middle portion shallow, and for a Goodyear shoe forming the entire periphery of the piece thicker. Moreover, this is accomplished by my method without waste, whereas all the sheet fillers heretofore used have produced waste in the same way that I am now seeking to prevent or rather to utilize and overcome. So likewise, without going into further detail it will be understood that my method may be used with the same material and in the same way for making backings for innersoles, cheap counters, shank stays and various other elements of a shoe which are capable of employing substantially the same sort of composition which is found in this waste. My process condenses, toughens, and solidifies and hardens the same to thorough durability and strength. It will be understood that the usual rubber making machinery is very massive and readily adaptable to this use so as to reduce the mass properly in the first place and then harden it, shape it, and condense it, rapidly, inexpensively and thoroughly. In the respects above mentioned my product is better than the original, because it is rendered stronger by my method, more durable, and is absolutely uniform. In other words my method eliminates the irregularities and weaknesses which have heretofore resulted from the skiving and weakening steps in the manufacture of the impregnated felt. The process of skiving tends to tear or pull and distort the fibres of the fabric foundation, felt for instance, and disrupt the impregnating stiffener, whereas my method operates in exactly the opposite manner to solidify, toughen and strengthen the blank at this previously weakened feather edge region. Moreover, my method enables the manufacturer to make the feather edge deeper i. e. wider or shaped at will around the toe portion (or upper curve of the blank as shown in Fig. 2), which has not been possible heretofore in the ordinary process of skiving. By especially shaping or increasing the width of the feather edge at the region mentioned, the folding or crimping and lasting of the box material is facilitated. On the other hand it will be understood that my blank or sliced piece 17 as sliced off from the column 9 may be skived by the usual skiving machine and in the usual manner if desired.

The object of making the sliced blanks slightly smaller than the finished product is to allow for the action of the press (Fig. 7) the effect of which is not merely to compact and shape the blank but to cause the material of the blank to flow or extrude from the thicker mass of the slice into the peripheral feathered edge. Or, the blanks might be made the same size and shape as the finished product in which case the flowing of the material under pressure could be inward from the thinned edge toward the center.

Instead of cutting the slices in a perpendicular plane across the bar 9 as illustrated in Fig. 5, the slices may be cut on a diagonal plane slanting from the upper curved surface of the bar 9 to the lower relatively flat surface, as illustrated by the dotted lines 17$^a$ in Fig. 8, with the result that blanks will be beveled or tapered both at the toe edge and the rear edge. This will provide a tapered edge similar to the feathered edge 27 at the parts of the blank where the tapered edge is most important in the lasted shoe. The blanks thus cut from rod 9 on a bias may, if desired, be used in the form in which they come from the cutting machine, after the fabric backer 19 is applied, or they may be pressed in the dinker (Fig. 7) and further shaped as already described.

When the blanks are to be used as shoe fillers of the kind thicker at the toe end of the blank than at the ball end, instead of pressing them to that form as hereinbefore described, the same result may be accomplished by cutting the slices on planes inclined alternately to one another as shown at 17$^b$ in Fig. 9.

What I claim is:

1. The herein described method of making a shoe element such as a box toe blank, filler piece, or the like, consisting of reducing the material to a plastic condition and forming the same into a bar having a cross section corresponding approximately to the shape of the ultimate article, then slicing said bar transversely into successive leaf-like blanks of said shape, and then subjecting the same to a finishing treatment under pressure.

2. The herein described method of making a shoe element such as a box toe blank, filler piece, or the like, consisting of reducing the material to a plastic condition and forming the same into a bar having a cross section corresponding approximately to the shape of the ultimate article, then slicing said bar transversely into successive leaf-like blanks of said shape, and then subjecting the same to a finishing treatment under pressure including securing a backer thereto.

3. The herein described method of utilizing such waste as the trimmings of box toe manufacture, consisting of first macerating the trimmings into a plastic mass and then forcing the same into a condensed, shaped bar having the cross section of approximately the ultimate shape of the article to be formed, and slicing said bar transversely into pieces of approximately the ultimate thickness of said article, and then shaping the slice into the desired shoe element.

4. The herein described method of making a box toe blank, consisting of reducing the box toe forming materials to a plastic condition, molding the plastic mass under pressure into a bar having the cross sectional shape of the box toe blank and then slicing said bar transversely into blanks, and forming a feather edge on said blanks by pressure.

5. The herein described method of making a box toe blank, consisting of reducing the box toe forming materials to a plastic condition, molding the plastic mass under pressure into a bar having the cross sectional shape of the box toe blank and then slicing said bar transversely into blanks, and forming a feather edge on said blanks by pressure, and simultaneously impressing into said edge radial impressions for facilitating and directing the subsequent crimping and folding operation in lasting the box.

6. The herein described method of making a box toe blank, consisting of reducing the box toe forming materials to a plastic condition, molding the plastic mass under pressure into a bar having the cross sectional shape of the box toe blank and then slicing said bar transversely into blanks, providing a fabric backer having the same shape as said blank, and uniting the blank and backer together by pressure.

7. The herein described method of making a box toe blank, consisting of reducing the box toe forming materials to a plastic condition, molding the plastic mass under pressure into a bar having the cross sectional shape of the box toe blank and then slicing said bar transversely into blanks, providing a fabric backer having the same shape as said blank, and uniting the blank and backer together by pressure and simultaneously forming a feather edge around the blank by the same pressure.

8. The herein described method of making a shoe element such as a box toe blank, filler piece, or the like, consisting of reducing the material to a plastic condition and forming the same into a bar having a cross section corresponding approximately to the shape of the ultimate article, and then slicing said bar on diagonal or slanting planes into successive leaf-like blanks of said shape having tapered beveled edges on opposite sides.

9. The herein described method of making a shoe element such as a box toe blank, filler piece, or the like, consisting of reducing the material to a plastic condition and forming the same into a bar having a cross section corresponding approximately to the shape of the ultimate article, and then slicing said bar on planes of alternate inclination one to another, into successive leaf-like blanks of said shape, thereby producing blanks thicker at one end than at the other end.

Signed by me at Boston, Massachusetts, this 16th day of July, 1928.

JOHN J. DALY.